United States Patent [19]

Arter et al.

[11] Patent Number: 4,890,945
[45] Date of Patent: Jan. 2, 1990

[54] ROTARY DIE CYLINDER BEARER ATTACHMENT

[75] Inventors: James B. Arter, Breese, Ill.; Daniel A. Parsons, Kirkwood, Mo.; Thomas M. Serra, High Ridge, Mo.; Bruce L. Thomas, Ellisville, Mo.

[73] Assignee: Allied Gear & Machine Company, St. Louis, Mo.

[21] Appl. No.: 13,661

[22] Filed: Feb. 12, 1987

[51] Int. Cl.⁴ .................................................. F16B 3/00
[52] U.S. Cl. ........................................ 403/2; 403/259; 403/356; 83/665
[58] Field of Search ............... 403/2, 259, 261, 320, 403/292, 297, 356, 355, 380; 83/665

[56] References Cited

U.S. PATENT DOCUMENTS

| | | | |
|---|---|---|---|
| 611,603 | 10/1898 | Bradley | 403/259 X |
| 921,042 | 5/1909 | Williams | 403/356 |
| 970,915 | 9/1910 | Gebott | 83/665 |
| 1,556,055 | 10/1925 | Weber | 83/665 |
| 2,104,496 | 1/1938 | Schaefer | 403/297 |
| 2,151,831 | 3/1939 | Buccicone | |
| 2,613,571 | 10/1952 | Herman | |
| 2,855,787 | 10/1959 | Kumro et al. | 403/356 X |
| 2,887,891 | 5/1959 | Perez | 403/356 X |
| 2,888,076 | 5/1959 | Lanstrom | 83/665 |
| 3,747,196 | 7/1973 | Whittington | 403/2 X |
| 3,823,633 | 7/1974 | Ross | |
| 3,880,030 | 4/1975 | Rosengren | |
| 3,894,461 | 7/1975 | Jakob | 83/665 |
| 3,908,499 | 9/1975 | Reed | 83/665 |
| 4,086,012 | 4/1978 | Buckley et al. | 403/2 |
| 4,325,518 | 4/1982 | Karr et al. | 403/259 X |
| 4,389,202 | 6/1983 | Hochreuter | 403/2 X |
| 4,474,493 | 10/1984 | Welch | 403/292 X |

FOREIGN PATENT DOCUMENTS 398094  9/1933  United Kingdom ................ 403/261

Primary Examiner—Randolph A. Reese
Assistant Examiner—Peter M. Cuomo
Attorney, Agent, or Firm—Cohn, Powell & Hind

[57] ABSTRACT

This rotary die cylinder assembly (10) includes a cylinder (12) having end bearers (14) attached thereto. The cylinder includes intermediate body (16) and opposed end shafts (20). The body 16 is adapted to carry tool members (18) and the end shafts are externally threaded to receive the bearers, the bearers including an internally threaded bore (34). The cylinder body includes opposed annular end faces (30) adapted to receive associated bearer inner faces (32) in torqued metal-to-metal relation. An opening (42) is drilled between the faces (32, 33) of each of the bearers and extends into the the cylinder to receive a pin (44) to secure the bearers to the cylinder. Each opening extends into the cylinder body sufficiently so that the associated pins can be driven completely into the cylinder body end and out of engagement with the bearers. When this is done removal of the bearers and replacement thereof with new bearers, which can be pinned to the cylinders at a different location, is easily accomplished.

8 Claims, 1 Drawing Sheet

ROTARY DIE CYLINDER BEARER ATTACHMENT

BACKGROUND OF THE INVENTION:

This invention relates generally to rotary die cylinders used in the printing industry for slitting, scoring, perforating or line hole punching operations and particularly to a cylinder assembly having an improved means of attaching and securing hardened bearers to the mating die cylinder bodies and the replacement of such bearers.

There are numerous conventional methods of attaching bearers to their mating cylinder bodies. For example, the bearers can be shrink fitted to the cylinder journal shafts or they can be welded. These methods have the disadvantage that excessive heat used in the processes tends to distort the metal parts. It is also known to provide the bearer and cylinder in a one piece construction. However, this tends to be expensive and does not permit replacement of the bearers alone. Another method of attachment, and perhaps the most conventional, is to provide the bearers with retaining screws. This has the disadvantage of requiring a keyway and is not a particularly accurate method.

Although there are patents which address the problem of attaching bearers, or similar parts, to shafts none of them adequately address the twofold problem of secure attachment and simple replacement. For example, known improvements include U.S. Pat. No. 2,613,571 (Herman) which discloses a shaft having a threaded portion receiving compatiblly threaded lock nuts for holding a set of spacers and slitters in place, the spacers and slitters being held against relative rotation by several connecting pins. U.S. Pat. No. 2,151,831 (Buccicone) discloses an intermediate shaft attachment having a threaded and tapered inner portion received on the shaft, a cooperating tapered outer ring and a threaded outer nut which bears against the ring to hold the intermediate attachment in place. Another approach is disclosed in U.S. Pat. No. 1,556,055 (Weber) and U.S Pat. No. 3,908,499 (Reed) which disclose saw and knife mounts respectively, provided by a flanged collar and a cooperating ring member, the flange being provided with pins received by the cutting member to prevent relative rotation. These improved devices tend to be complicated and therefor expensive.

The present invention avoids the above disadvantages in a manner not revealed by the known prior art.

SUMMARY OF THE INVENTION

This invention provides hardened bearers for a rotary die cylinder assembly which are tightly secured to the cylinder body without welding or other heat processing attachment and yet are readily removable for replacement.

The bearers are provided with accurately threaded journal ends which receive the equally accurately threaded bore of the bearers so that the bearers, when torqued into place and pinned to prevent untorquing are in metal-to-metal contact with the cylinder body end faces. This attachment method provides that the individual parts function as a unitary cylinder and bearer combination.

Each bearer attachment utilizes a relatively short connection pin and a hole depth greater than the pin length so that the connection pin may be driven deep into the cylinder body to permit the bearer to be removed and a new bearer to be attached with the minimum of down time.

The rotary die cylinder assembly includes a cylinder having a longitudinal axis and opposed ends, said cylinder including an intermediate cylindrical body and opposed reduced diameter concentric shafts at each end, each shaft having an externally threaded portion, said shaft and said body defining an annular engagement face of the cylinder body. The assembly also includes a pair of cylindrical bearers, each bearer including an inner face and an outer face and a concentric bore extending between said faces; said bore having an internally threaded portion mating with the externally threaded portion of an associated shaft, each bearer being threadedly received on an associated shaft until said bearer inner face is engaged with the cylinder body annular face; each cylinder end and each bearer including a pin-receiving opening, said openings being in register when a bearer inner face is engaged with an associated cylinder annular face. The assembly also includes a pair of pins, each receivable within associated bearer and cylinder openings to provide a shear connection between said bearer and said cylinder.

It is an aspect of this invention to provide that the depth of each cylinder opening is greater than the length of the pin whereby the pin can be received into the associated cylinder opening completely to remove the shear connection and permit each bearer to be threadedly removed from the cylinder.

It is another aspect of this invention to provide that each cylinder pin-receiving opening is located in an annular engagement face in offset relation from the longitudinal axis and each bearer pin-receiving opening extends between said bearer inner and outer faces in offset relation from the longitudinal axis.

Yet another aspect of this invention is to provide that each shaft includes an unthreaded portion between the engagement face of the threaded portion, each bearer bore includes an unthreaded portion between the inner face and the threaded portion and said unthreaded shaft portion and said unthreaded bore portion are circumferentially engageable.

Still another aspect of this invention is to provide that each bearer includes a circumferentially chamfered margin between said bearer inner face and unthreaded portion.

Another aspect of this invention is to provide that each shaft includes an inner portion and an outer portion, the outer portion being of reduced diameter and providing a bearing portion.

It is an aspect of this invention to provide a method of threadedly connecting a bearer having an engagement face and an internally threaded bore to a cylinder having a cooperating engagement face and a threaded shaft. The method includes the steps of threading the bearer onto the cylinder shaft until the engagement faces are engaged; drilling an opening through the bearer and into the cylinder; and inserting a pin into the opening until said pin extends between said bearer and said cylinder to provide a shear connection.

It is another aspect of this invention to provide a method of connecting a bearer to a cylinder including the step of displacing the pin to remove the shear connection between the bearer and the cylinder; unthreading the bearer to remove it from the cylinder; threading a new bearer onto the cylinder shaft until the engagement face is engaged; drilling an opening through the new bearer and into the cylinder with said opening passing through the bearer and into the cylinder at a different location in the cylinder from the original pin and inserting a pin into the opening until said pin extends between said bearer and said cylinder to provide a shear connection.

In another aspect of this invention the method of connecting a bearer to a cylinder provides that the opening drilled through the bearer and into the cylinder is offset from the longitudinal axis of the cylinder and passes through both engagement faces.

In still another aspect of this invention the method of connecting the bearer to the cylinder provides for drilling the opening in the cylinder to adapt an access of the length of the pin.

Still another aspect of this invention is to provide a method of connecting a bearer to a cylinder in which the bearer engagement face is torqued into tight engagement with the cylinder engagement face prior to the drilling of the pin receiving opening.

It is an aspect of this invention to provide a bearer attachment for a rotary die cylinder assembly which is relatively simple and inexpensive to manufacture and relatively easy to use and that facilitates accurate placement, removal and re-placement of the bearers.

Figure 1:
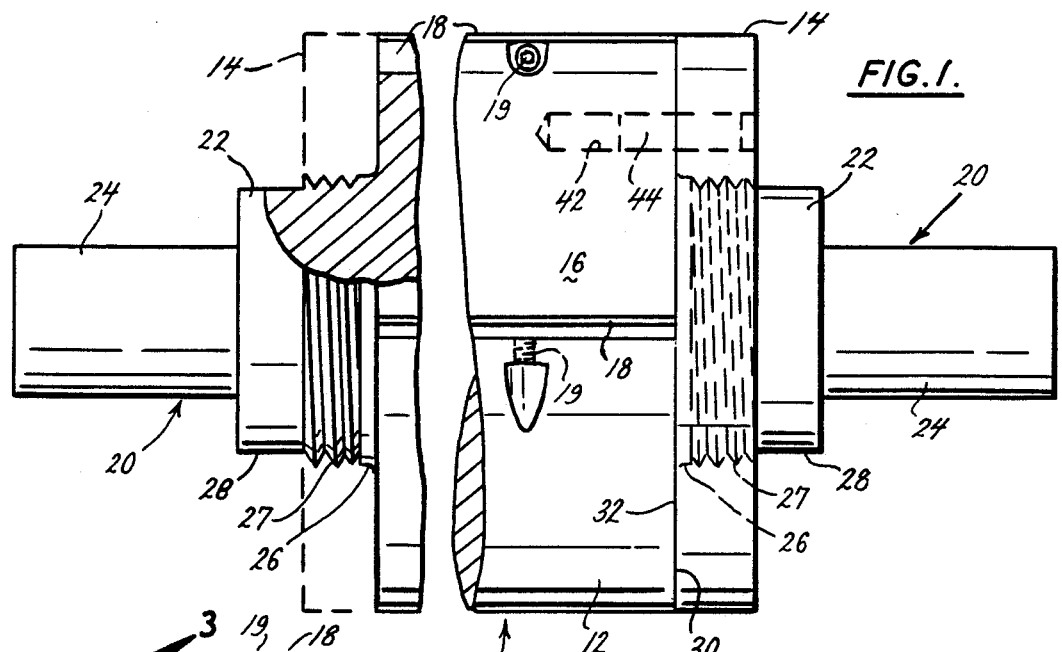
FIG. 1 is a fragmentary, elevational view of a rotary die cylinder.
Figure 2:
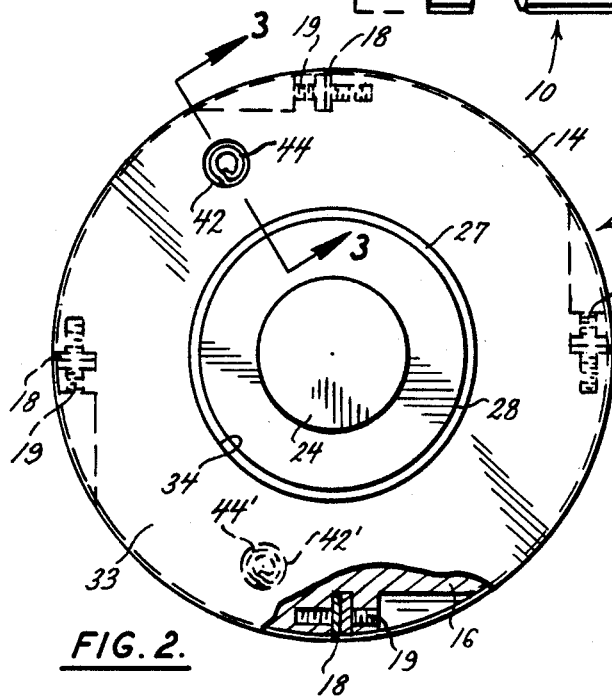
FIG. 2 is an end view of the rotary die cylinder.

DESCRIPTION OF THE PREFERRED EMBODIMENT:

Referring now by reference numerals to the drawing and first to FIGS. 1 and 2 it will be understood that the rotary die cylinder is indicated by numeral 10 and includes a cylinder 12 having a pair of bearers 14 attached thereto.

The cylinder 12, which is rotatable about its longitudinal axis, includes an intermediate body 16 which is adapted to carry a plurality of tools. In the embodiment shown the tools are longitudinally extending, circumferentially spaced paper perforating blades 18 with back-up pads held in place in the slotted face of the cylinder body 16 by set screws 19. However, it will be understood that the blades 18 are shown merely by way of example and that the cylinder body 16 can readily be adapted to receive, for example, rotary cutting dies for providing perforations or line hole punching or similar operations.

The cylinder 12 includes opposed unitarily formed concentric journal shafts 20. Each shaft 20 includes an inner portion 22 and a reduced diameter outer portion 24. The shaft inner portion 22 includes a short, unthreaded portion 26, an externally threaded portion 27, which receives the bearer 14 in threaded relation, as will be described, and a slightly reduced diameter unthreaded portion 28 adapted to receive a drive gear (not shown). The short, unthreaded inner portion 26, which is immediately adjacent the cylinder body 16, cooperates with said cylinder body to define an annular end face engagement indicated by numeral 30.

Figure 5:
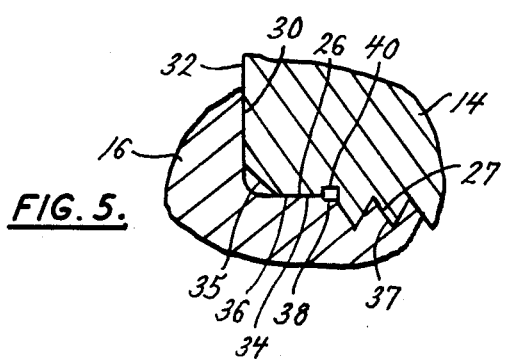
FIG. 5 is an enlarged fragmentary detail in cross section of the joint between the cylinder and bearer.

Each bearer 14 includes an inner face 32 and an outer face 33 and a concentric bore 34 extending between said inner and outer faces. The bore 34, as best shown in FIG. 5, includes an inner end margin 35, chamfered to clear the radius between the shaft inner portion 22 and the cylinder body 16, a short unthreaded portion 36 received by the short unthreaded portion 26 of the inner shaft portion 22 and an internally threaded portion 37, threaded to mate exactly with the externally threaded inner shaft portion 27.

In the embodiment shown the engaging shaft portion 26 and bearer portion 36 are machined to very close tolerances of five ten-thousandths of one inch (0.0005") and the mating thread includes relief grooves 38 and 40, which permit the bearer inner face 32 to be torqued into tight metal-to-metal contact with the annular cylinder end face 30, the amount of torque being determined by the thread diameter.

Once the necessary face-to-face contact engagement has been made each of the bearers 14 is drilled from the outer face 33 to the inner face 32 and the drilling continued beyond the annular cylinder end face 30 to provide a pin-receiving opening 42. The opening 42 is of a diameter to receive a pin 44 of the overlap spiral type such as manufactured under the trademark Spirol. The pin 44, by virtue of its longitudinal slot, is diametrically compressible and, accordingly, provides substantial spring-loaded, impact and shear resistance preventing relative movement between the bearers 14 and the cylinder body 16. The pin 44 is driven into the opening 42 so that the pin ends are substantially equi-distance from the contacting faces 30 and 32. Once in place, this connection provide excellent resistant against untorquing so that the tight metal-to-metal contact is maintained and the two bearers 14 and the cylinder 12 function virtual as a single unit. The bearers 14 can be ground to finish size after the pin connection has been made.

Figure 3:
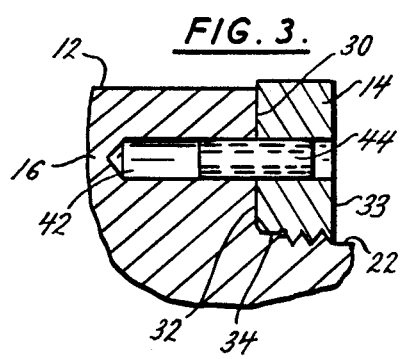
FIG. 3 is a fragmentary, sectional view taken on line 3—3 of FIG. 2 showing a connection pin in the connected position.
Figure 4:
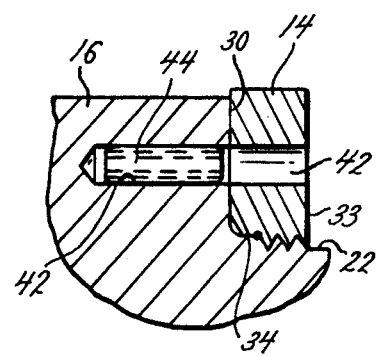
FIG. 4 is a similar view to FIG. 3 but with the pin shown driven completely into the cylinder body prior to removal of the bearer.

Importantly, in the embodiment shown, the depth of the opening 42 extends into the cylinder from the end face a substantially greater amount than the length of the pin 44. For example, the depth of the hole into the cylinder may be twenty five percent (25%) greater than the pin length. The result of this is that when it becomes necessary to to displace the pins 44 remove the bearers 14 for replacement purposes it is simply a matter of driving the pin 44 substantially completely into the opening 42. That is to say, from the position shown in FIG. 3 to the position shown in FIG. 4. When this has been accomplished the bearers 14 can easily be untorqued and readily removed from the shaft threaded portion 27.

When the old bearers 14 are replaced by new bearers, the new bearers are simple torgued into metal-to-metal contact, as before, and a new opening drilled at a different location to the old opening shown by 42' in FIG. 2. The new bearer is then pinned securely into place as before.

Essentially, the method of making this cylinder bearer attachment includes providing opposed concentric threaded shafts 20 adjacent each end of the cylinder body 16 and providing a pair of bearers 14, each having a compatibly threaded bore 34, adapted to be received by an associated threaded shaft 20 and then threadedly connecting the bearers to the shafts 20. The bearers 14 are torqued into engagement with associated cylinder body end faces 30 so that each bearer inner face 32 is in tight, metal-to-metal contact with an associated cylinder end face 30. Following this procedure, an opening 42 is drilled through each of the bearers 14 parallel to, and offset from, the longitudinal axis of rotation of the cylinder body 16 and the drilling continued into said cylinder body. Each opening 42 is provided with a pin 44. In the embodiment shown, a correctly sized single pin will suffice to secure the bearers to the cylinder body so as to prevent untorquing.

In the preferred embodiment, the depth of the opening is about one and one quarter (1.25) times the length of the pin and this arrangement permits the pin to the driven into the cylinder body 16, clear of the bearers 14. When this is done the shear connection between the cylinder body 16 and the bearers 14 is no longer present and the bearers can be easily removed. With this system there is no need to retrieve the pin 44, which is an inexpensive and expendable item. Replacement bearers 14 can be readily installed by repeating the process described above and drilling the bearers 14 and cylinder body 16 again, taking care to avoid the original pin opening 42' in the cylinder body 16.

It is possible to vary the procedure outlined above by making the depth of the opening in the cylinder about one-half of the pin length. In this case it will be necessary to use an extractor (not shown) to retrieve the pin, but otherwise the method is the same as that described. It is also possible to pin the bearers 14 to the shaft 20, for example by providing the bearer with a boss (not shown) which can be radially drilled, the drilling being continued into the shaft 20.

In view of the above it will be seen the various aspects and features of the invention are achieved and other advantages results obtained. While a preferred embodiment of the invention has been shown and described, it will be clear to those skilled in the art that changes and modifications may be made therein without departing from the invention in its broader aspects.

We claim as our invention:

1. A rotary die cylinder assembly, comprising:
   (a) a cylinder having a longitudinal axis and opposed ends, and said cylinder including an intermediate cylindrical body and opposed reduced diameter concentric shafts at each end, each shaft having an externally threaded portion, said shaft and said body defining an annular engagement face of the cylindrical body,
   (b) a pair of cylindrical bearers, each bearer including an inner face and an outer face and a concentric bore extending between said faces, said bore having an internally threaded portion mating with the externally threaded portion of an associated shaft, each bearer being threadedly received on an associated shaft with said bearer inner face engaged in tight, face-to-face contact with an adjacent cylindrical body annular engagement face,
   (c) each cylinder end and each associated bearer including a pin-receiving opening, said associated openings being continuous and said opening in said bearer extending completely through the bearer to the adjacent cylinder end, said openings being in register when a bearer inner face is engaged in said tight, face-to-face contact with an associated cylindrical annular face, and
   (d) a pair of pins, each pin being receivable within an associated opening of one bearer only to provide a counter-rotational shear connection between said bearer and said contacting faces.

2. A rotary die cylinder assembly as defined in claim 1, in which:
   (e) the depth of each cylinder opening is greater than the length of the pin whereby the pin can be received into the associated cylinder opening completely to remove the shear connection and permit each bearer to be threadedly removed from the cylinder.

3. A rotary die cylinder assembly as defined in claim 1, in which:
   (e) each cylinder pin-receiving opening is a blind opening located in an annular engagement face in offset relation from the longitudinal axis.

4. A rotary die cylinder assembly as defined in claim 1, in which:
   (e) each shaft includes an unthreaded portion between the engagement face and the threaded portion,
   (f) each bearer bore includes an unthreaded portion between the inner face and the threaded portion, and
   (g) said unthreaded shaft portion and said unthreaded bore portion are circumferentially engageable.

5. A rotary die cylinder assembly as defined in claim 4, in which:
   (h) each bearer includes a circumferentially chamfered margin between the inner face and said bearer unthreaded portion.

6. A rotary die cylinder assembly as defined in claim 5, in which:
   (i) a circumferential groove is provided between each shaft threaded and unthreaded portions and a corresponding circumferential groove is provided between the bearer bore threaded and unthreaded portions to provide a substantially rectangular recess facilitating a close fitup when the bearer is attached to the associated cylinder.

7. A rotary die cylinder assembly as defined in claim 1, in which:
   (e) each shaft includes an inner portion and an outer portion, the outer portion being of reduced diameter and providing a journal bearing portion.

8. A rotary die cylinder assembly, comprising:
   (a) a cylinder having a longitudinal axis and opposed ends, and said cylindrical including an intermediate cylindrical body and opposed reduced diameter concentric shafts at each end, each shaft having an externally threaded portion, said shaft and said body defining an annular engagement face of the cylindrical body,
   (b) a pair of cylindrical bearers, each bearer including an inner face and an outer face and a concentric bore extending between said faces, said bore having an internally threaded portion mating with the externally threaded portion of an associated shaft, each bearer being threadedly received on an associated shaft with said bearer inner face engaged in tight, face-to-face contact with an adjacent cylindrical body annular engagement face,
   (c) each cylinder end and each associated bearer including a pin-receiving opening, said associated openings being continuous and said opening in said bearer extending completely through the bearer to the adjacent cylinder end and each said opening in said cylinder being a blind unthreaded opening, said openings being in register when a bearer inner face is engaged in said tight face-to-face contact with an associated cylindrical annular face, and (d) a pair of pins, each pin being receivable within an associated opening of one bearer only to provide a counter-rotational shear connection between said bearer and said contacting faces, the depth of said blind openings being greater than the length of the pin whereby the pin can be received into the associated cylinder opening completely to remove the shear connection and permit each bearer to be threadedly removed from the cylinder.

* * * * *

UNITED STATES PATENT AND TRADEMARK OFFICE
CERTIFICATE OF CORRECTION

PATENT NO. : 4,890,945

DATED : January 2, 1990

INVENTOR(S) : Arter et al.

It is certified that error appears in the above-identified patent and that said Letters Patent is hereby corrected as shown below:

```
Column 5, line 64, after "drical" add --body--.
          line 68, after "said" add --cylindrical body--.
Column 6, line 45, delete "cylindrical," insert --cylinder--.
          line 68, after "cylindrical," add --body--.
Column 7, line 4, before "contacting," add --cylindrical body--.
```

Signed and Sealed this

Seventh Day of July, 1992

Attest:

DOUGLAS B. COMER

*Attesting Officer*  *Acting Commissioner of Patents and Trademarks*